United States Patent
Chen et al.

(10) Patent No.: US 7,929,480 B2
(45) Date of Patent: *Apr. 19, 2011

(54) QUALITY INDICATOR BIT (QIB) GENERATION IN WIRELESS COMMUNICATION SYSTEMS

(75) Inventors: Qingxin (Daisy) Chen, Del Mar, CA (US); Luca Blessent, San Marcos, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/022,354

(22) Filed: Dec. 22, 2004

(65) Prior Publication Data

US 2005/0135323 A1    Jun. 23, 2005

Related U.S. Application Data

(62) Division of application No. 10/242,877, filed on Sep. 11, 2002.

(51) Int. Cl.
*H04B 7/185* (2006.01)
(52) U.S. Cl. .................. 370/318; 455/69; 455/522
(58) Field of Classification Search .......... 370/317–318, 370/328, 335, 342; 455/522.69, 69, 522
See application file for complete search history.

(56) References Cited

U.S. PATENT DOCUMENTS

| | | |
|---|---|---|
| 2,498,186 A | 2/1950 | Stockbarger er et al. |
| 2,550,173 A | 4/1951 | Swinehart et al. |
| 3,766,080 A | 10/1973 | Swinehart et al. |
| 3,769,230 A | 10/1973 | Robinson et al. |
| 3,959,442 A | 5/1976 | Pastor et al. |
| 4,038,201 A | 7/1977 | Hargreaves |
| 4,048,514 A | 9/1977 | Haussuehl et al. |

(Continued)

FOREIGN PATENT DOCUMENTS

DE    1 291 321    3/1969

(Continued)

OTHER PUBLICATIONS

"Growth and Properties of Scintiliating Crystals BaF2," Jiang et al., *Journal of Crystal Growth*, vol. 79, No. 1-3, Dec. 1986, pp. 720-722.

(Continued)

*Primary Examiner* — Ricky Ngo
*Assistant Examiner* — Phuongchau Ba Nguyen
(74) *Attorney, Agent, or Firm* — Howard H. Seo; Sayed H. Beladi

(57) ABSTRACT

Techniques for generating quality indicator bits in a wireless communication system (e.g., a cdma2000 that implements IS-2000). In one method, a determination is first made whether a good data frame was received from a first transmission for the current frame interval. This first transmission may be a non-continuous transmission on a forward dedicated control channel (F-DCCH) defined by IS-2000. If a good data frame was received, then a quality indicator bit is generated based on the good data frame. Otherwise, the quality indicator bit is generated based on a second transmission, which may comprise power control bits that are transmitted even when no data frames are sent in the first transmission. The received signal quality for the power control bits can be measured and compared against a threshold, and the quality indicator bit is then set based on the result of the comparison. The threshold may be dynamically updated.

12 Claims, 6 Drawing Sheets

U.S. PATENT DOCUMENTS

| | | | |
|---|---|---|---|
| 4,053,572 A | 10/1977 | Moss et al. | |
| 4,101,331 A | 7/1978 | Anderson | |
| 4,128,589 A | 12/1978 | Pastor et al. | |
| 4,736,249 A * | 4/1988 | Iizuka et al. | 358/435 |
| 5,000,548 A | 3/1991 | Mercado | |
| 5,039,858 A | 8/1991 | Anderson et al. | |
| 5,245,629 A * | 9/1993 | Hall | 370/342 |
| 5,265,119 A | 11/1993 | Gilhousen et al. | |
| 5,461,639 A * | 10/1995 | Wheatley et al. | 370/342 |
| 5,745,520 A | 4/1998 | Love | |
| 5,757,846 A | 5/1998 | Vasudevan | 375/200 |
| 5,768,684 A * | 6/1998 | Grubb et al. | 455/69 |
| 5,852,627 A | 12/1998 | Ershov | |
| 5,856,991 A | 1/1999 | Ershov | |
| 5,901,163 A | 5/1999 | Ershov | |
| 5,970,082 A | 10/1999 | Ershov | |
| 5,978,409 A | 11/1999 | Das et al. | |
| 5,982,800 A | 11/1999 | Ishihara et al. | |
| 6,069,749 A | 5/2000 | Omura | |
| 6,181,480 B1 | 1/2001 | Ito | |
| 6,201,634 B1 | 3/2001 | Sakuma et al. | |
| 6,295,289 B1 | 9/2001 | Ionescu | |
| 6,298,080 B1 | 10/2001 | Heist et al. | |
| 6,309,461 B1 | 10/2001 | Gianoulakis et al. | |
| 6,342,312 B2 | 1/2002 | Oba et al. | |
| 6,377,338 B1 | 4/2002 | Suenaga | |
| 6,395,657 B2 | 5/2002 | Mayolet et al. | |
| 6,451,111 B1 | 9/2002 | Beall et al. | |
| 6,526,031 B1 * | 2/2003 | Zaff et al. | 370/335 |
| 6,587,442 B1 * | 7/2003 | Tripathi | 370/318 |
| 6,630,117 B2 | 10/2003 | Sparrow | |
| 6,654,613 B1 * | 11/2003 | Maeng et al. | 455/522 |
| 6,728,551 B2 * | 4/2004 | Chang | 370/318 |
| 6,731,948 B1 * | 5/2004 | Lee et al. | 370/328 |
| 6,850,736 B2 | 2/2005 | McCune, Jr. | |
| 6,901,268 B2 | 5/2005 | Chang | |
| 7,006,842 B2 | 2/2006 | Bi et al. | |
| 7,170,923 B2 * | 1/2007 | Yeo et al. | 455/522 |
| 2001/0033553 A1 | 10/2001 | Bi et al. | 370/318 |
| 2001/0040880 A1 * | 11/2001 | Chen et al. | 370/337 |
| 2001/0046878 A1 * | 11/2001 | Chang | 455/522 |
| 2002/0011202 A1 | 1/2002 | Gianoulakis et al. | |
| 2002/0081977 A1 | 6/2002 | McCune, Jr. | 455/67.1 |
| 2002/1012497 | 8/2002 | Sparrow | |

FOREIGN PATENT DOCUMENTS

| | | |
|---|---|---|
| DE | 222 426 A1 | 5/1998 |
| EP | 0 875 778 A1 | 11/1998 |
| EP | 0 942 297 | 9/1999 |
| EP | 1 006 373 A2 | 6/2000 |
| EP | 0 869 203 B1 | 8/2001 |
| EP | 1 130 419 A2 | 9/2001 |
| EP | 1 139 138 B1 | 10/2001 |
| JP | 09-315894 | 12/1997 |
| JP | 10-1310 | 1/1998 |
| JP | 1-59799 | 3/1998 |
| WO | 91/11734 | 8/1991 |
| WO | 0 942 297 A22 | 9/1999 |
| WO | 99/46836 | 9/1999 |
| WO | 00/75697 A1 | 12/2000 |
| WO | 01/01182 | 1/2001 |
| WO | 01/37052 A1 | 5/2001 |
| WO | 01082504 | 11/2001 |
| WO | 02/31232 | 4/2002 |
| WO | 04025871 | 3/2004 |

OTHER PUBLICATIONS

"Modern Optical Engineering—The Design of Optical Systems, " Warren J. Smith, *Modern Opt Eng.*, McGraw-Hill Book Company, 1966, Article: "Optical Materials and Coatings, "pp. 145-161: Article; "The Design of Optical Systems: General ", pp. 326-355.

U.S. Appl. No. 09/327,043, filed Jun. 7, 1999, Gianoulakis et al., Crystal Growth and Annealing Method and Apparatus, pp. 1-21.

Optovac, optical Crystal Handbook, Jan. 1993, pp. 1-41.

"Optical Characteristics of Large Single Crystals of Flourides", Chernevskaya, E.G., et al., Opt. Technol. (USSR), Jun. 1973, vol. 40, No. 6 pp. 379-380.

Svetito, O. Principles of Lasers., $3^{rd}$ Ed., 1989, pp. 330-331.

Lambda Physik webpage: www.lambdaphysik.com/Microlithography/fullstory.asp?news_id=22, Lithography News, Lambda Physik Ships Fifth 157nm Lithography Laser, p. 1 Feb. 7, 2000.

Lambda Physik webpage: www.lambdaphysik.com/Microlithogaphy/novaline.asp, Novaline® Lithography Series, pp. 1-2 Feb. 7, 2000.

Lambda Physik webpage: www.lambdaphysik.com/Microlithography/mooreslaw.asp, Lithography—History, Moore's Law, pp. 1-3. Feb. 7, 2000.

"Lambda Physik Fourth Annual 157nm/EUV Symposium"website: http://www.lambdaphysik.com/microlithography/157. (printed out Nov. 2001).

Lambda Physik webpage: www.lambdaphysik.com/Microlithography/fullstory.asp, Lithography News, Lambda Physik Announces Breakthrough in 157 nm F2 Lithography, pp. 1-2. Feb. 7, 2000.

"Spatial Dispersion in the Dielectric Constant of GaAs, "Yu et al., *Solid State Comm*, vol. 9, pp. 1421-1424, 1971.

"Technology at a Glance-Fall 2001, "Website: http://www.nist.gov/public_affairs/taglance/tag01fall/fall2001.htm, pp. 1-11.

"Semicon West 2001, "Website: http://www.nist.gov.public_affairs/factsheet/semiconwest01.htm.

"Metrology Supporting Deep Ultraviolet Lithography. " Website: http://www.eeel.nist.gov/810.0/lithography_deep.html, published Jun. 2001, Ofc of Microelectronic Programs.

"Minimizing Spatial-dispersion-induced birefringence in crystals used for precision optics by using mixed crystals of materials with the opposite sign of the birefringence. " Website: http://physics.nist.gov/Divisions/Div842/Gp3/DUVMatChar/birefring.html. updated Aug. 1, 2001.

"The Trouble with Calcium Flouride. " *SPIEs oeMagazine*, pp. 23-25, Mar. 2002.

"$Ca_{1-x}Ba_xF_2$ and $Ca_{1-x}Sr_xF_2$ Mixed Crystals as potential solution to intrinsic birefringence problem for 157nm lithography, " Burnett et al., *SEMATECH 157nm Tech Date Rev*, Dec. 11, 2001, NIST.

"Stress-Optical coefficients of 157nm Materials, " Burnett et al., SEMATECH 157nm Tech Data Rev, Dec. 11, 2001, NIST.

"Intrinsic Birefringence in 157nm Materials, " Burnett et al., $2^{nd}$ *Int'l Symposium on 157nm Lithography*, May 15, 2001, NIST.

NIST updates for Jul. 9, 2001, website: http://www.nist.gov/public_affairs/update/upd010709.htm, pp. 1-8.

"Electron and Optical Physics Division" website: http://physics.nist.gov/TechAct/Div841/div841.h.html, *Tech Activities 2001*, pp. 1-9.

"Atomic Physics Division" website: http://physics.nist.gov/TechAct/Div842/div842h.html, *Tech Activities 2001*, pp. 1-17.

"Plasma Radiation Group: DUV Sources and Materials Characterization" website:http://physics.nist.gov/Divisions/Div 842/Gp3/DIVMatChar/index.html, pp. 1-2. Aug. 23, 2002.

"Absolute refractive indices and thermal coefficients of fused silica and calcium fluoride near 193nm, "*Appl Optics*, vol. 37, No. 25, Sep. 1, 1998, pp. 5964-5968.

"Intrinsic Birefringence in calcium fluoride and barium fluoride", *Phys Review B*, vol. 64, 241102(r), pp. 1-4. Nov. 29, 2001.

"Polarizability of Fluoride Ions in Fluorides with fluorite-type structure" Sorokin, N.I., *Crystallography Reports*, vol. 45, No. 6, 2000, pp. 976-978.

"Optical Anisotrophy of Silicon Single Crystals" Pastmak et al., Phys Review B, vol. 3, No.8, Apr. 15, 1971, pp. 2567-2571.

Barium Fluoride Patinal product info, EM Industries, website: www.emicoe.com/barfluor.cfm Feb. 15, 2002.

"Materials Problem snags 157nm lithography" *EETimes*website: www.eetimes.com/story/OEG20010720S0106, Jul. 20,2001, 4 pages.

"Industry Weighs shift to 157nm lithography" *EETimes*website: ww.eetimes.com/story/OEG20000518S0010, May 18, 2000, 4 pages.

International Search Report-PCT-US2003-028804, International Search Authority European Patent Office, Apr. 2, 2004.

Shukla M. et al.: "OPTOVAC, Optical Crystal Handbook," (Brookfield; Optovac) J Phys. D9L49 (1976) pp. 1-41.

* cited by examiner

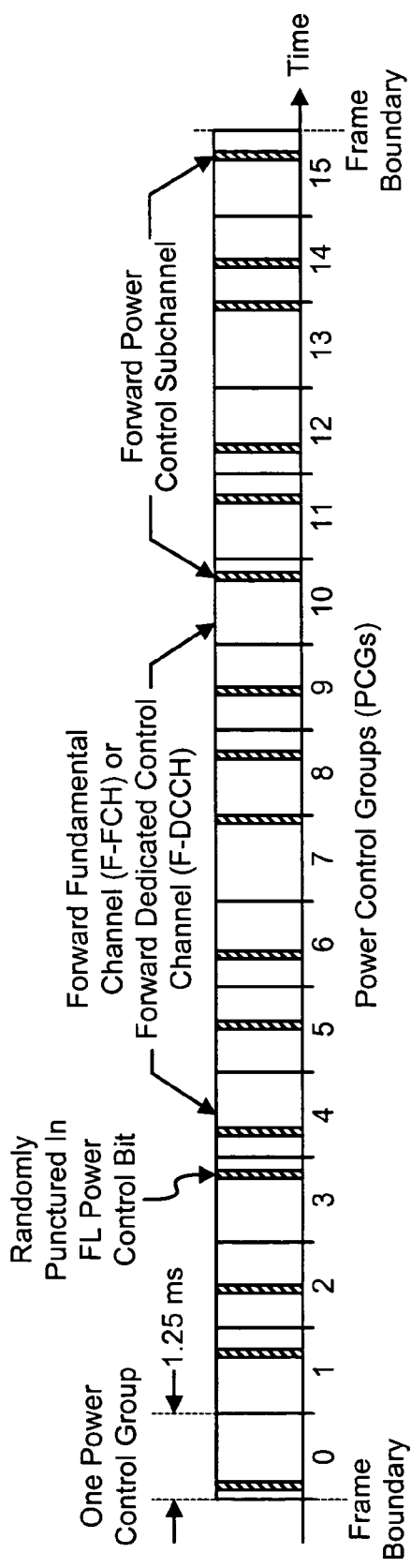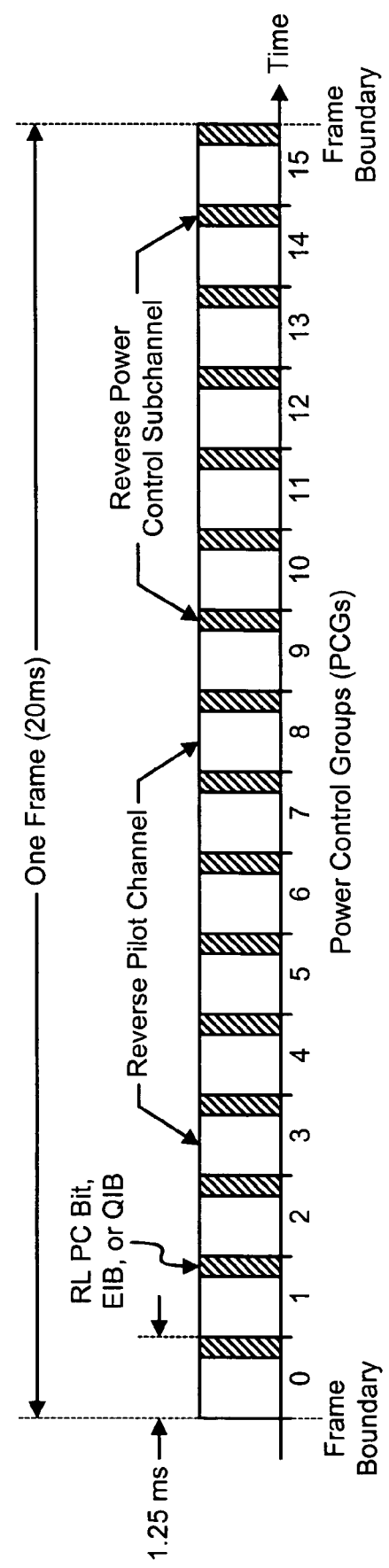
FIG. 3A
FIG. 3B

QUALITY INDICATOR BIT (QIB) GENERATION IN WIRELESS COMMUNICATION SYSTEMS

The present Application for Patent is a divisional of patent application Ser. No. 10/242,877 entitled "QUALITY INDICATOR BIT (QIB) GENERATION IN WIRELESS COMMUNICATION SYSTEMS" filed Sep. 11, 2002, pending, and assigned to the assignee hereof and hereby expressly incorporated by reference herein. This Application also claims priority to co-pending divisional patent application entitled "QUALITY INDICATOR BIT (QIB) GENERATION IN WIRELESS COMMUNICATION SYSTEMS" Ser. No. 10/242,877 filed today, Dec. 22, 2004.

BACKGROUND

1. Field

The present invention relates generally to communication, and more specifically to techniques for generating quality indicator bits (QIBs) in wireless communication systems.

2. Background

In a wireless (e.g., cellular) communication system, a user with a wireless terminal (e.g., a cellular phone) communicates with another user or entity via transmissions on the forward and reverse links with one or more base stations. The forward link refers to transmission from the base station to the terminal, and the reverse link refers to transmission from the terminal to the base station. The forward and reverse links are typically allocated different frequencies.

In a Code Division Multiple Access (CDMA) system, within the limit of physical channel resources, the total capacity of the forward link for each base station is determined by its total transmit power. Each base station may transmit data to a number of users concurrently on the same frequency band. A portion of the base station's total transmit power is then allocated to each active user such that the aggregate power allocated to all users is less than or equal to the total transmit power.

To maximize the forward link capacity, the amount of transmit power used for each terminal can be adjusted by a power control mechanism that attempts to achieve the desired level of performance with the minimum amount of transmit power. For a CDMA system, this power control mechanism is typically implemented with two power control loops. The first loop adjusts the transmit power such that the quality of the signal received at the terminal is maintained at a particular threshold level. The received signal quality is typically quantified by an energy-per-bit-to-noise-plus-interference ratio ($E_b/I_o$). The threshold level is often referred to as the power control setpoint (or simply, the setpoint). The second loop adjusts the setpoint such that the desired level of performance is maintained. This level of performance is typically given by a particular frame error rate (FER), e.g., 1% FER. The forward link power control mechanism thus attempts to reduce power consumption and interference while maintaining the desired level of performance for the terminal. This then maximizes the forward link capacity.

Some CDMA systems support the feedback of several types of power control commands to control the base station's transmit power for a given terminal. For example, in a cdma2000 system, a terminal may send back power control bits, erasure indicator bits (EIBs), or quality indicator bits (QIBs) for power control purposes. A power control bit is typically generated by comparing the received signal quality for a particular transmission (e.g., data, pilot, and so on) against the setpoint. Each power control bit would then request the base station to adjust its transmit power for the terminal either up or down by a particular amount (e.g., 1 dB). An erasure indicator bit indicates whether a data frame transmitted earlier by the base station was received correctly or in error by the terminal. A quality indicator bit indicates whether a previous data frame transmitted by the base station was received with sufficient or insufficient signal quality. Depending on the particular power control mode selected for use, the terminal is then configured to periodically send one of these three types of power control command back to the base station.

If the terminal is configured to send back quality indicator bits, then each quality indicator bit is typically generated based on a data frame transmitted on a designated forward channel. However, this forward channel may be operated in a non-continuous manner whereby data frames may not be transmitted on the forward channel some of the times. This non-continuous transmission is also referred to as discontinuous transmission (DTX). DTX frames (i.e., null or empty frames) are not transmitted on the forward channel, and a DTX event indicates the lack of transmission in a given frame interval. When DTX events are detected, the normal method for generating quality indicator bits based on the received data frames cannot be used since none were transmitted.

In one simple method for dealing with non-continuous transmission on the forward channel, all frames determined as DTX events are classified as having good received signal quality. However, quality indicator bits generated in this manner would not provide useful information for power control purposes. The transmit power for the terminal cannot be properly adjusted based on these quality indicator bits.

There is therefore a need in the art for techniques to generate quality indicator bits for a non-continuous transmission on a forward channel in a wireless communication system.

SUMMARY

Techniques are provided herein to generate quality indicator bits that can be used for power control purposes even when a non-continuous transmission is received on a forward channel being monitored. When a data frame is not detected on this forward channel, a second transmission that utilizes an associated forward channel may be used to estimate the received signal quality.

In one method for generating quality indicator bits in a wireless communication system (e.g., a cdma2000 system complaint with IS-2000), a determination is first made whether a good data frame was received from a first transmission for the current frame interval. This first transmission may be a non-continuous transmission on a forward dedicated control channel (F-DCCH) defined by IS-2000. If a good data frame was received, then a quality indicator bit is generated based on the good data frame. Otherwise, the quality indicator bit is generated based on a second transmission. The second transmission may comprise power control bits that are transmitted on the associated forward power control subchannel even when no data frames are sent in the first transmission. The received signal quality for the first transmission may then be estimated by the received signal quality for the second transmission.

The quality indicator bit may be generated based on the received power control bits by (1) determining the received signal quality for the power control bits received during the current frame interval, (2) comparing the received signal quality for the power control bits against a threshold, and (3) based on the result of the comparison, setting the quality indicator bit to, e.g., "0" to indicate sufficient received signal quality or "1" to indicate insufficient received signal quality.

The threshold can be dynamically updated. For example, the threshold may be updated based on (1) the setpoint used for the first transmission, (2) the received signal quality for previously received good data frames, (3) the received signal quality for power control bits associated with prior received good data frames, and so on. The threshold may be initialized to a value derived based on the minimum required setpoint for the first transmission.

Various aspects and embodiments of the invention are described in further detail below. The invention further provides methods, program codes, digital signal processors, receiver units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 3A illustrates the F-FCH, F-DCCH, and Forward Power Control Subchannel defined by IS-2000;

FIG. 3B illustrates the Reverse Power Control Subchannel and the Reverse Pilot Channel defined by IS-2000;

DETAILED DESCRIPTION

Figure 1:
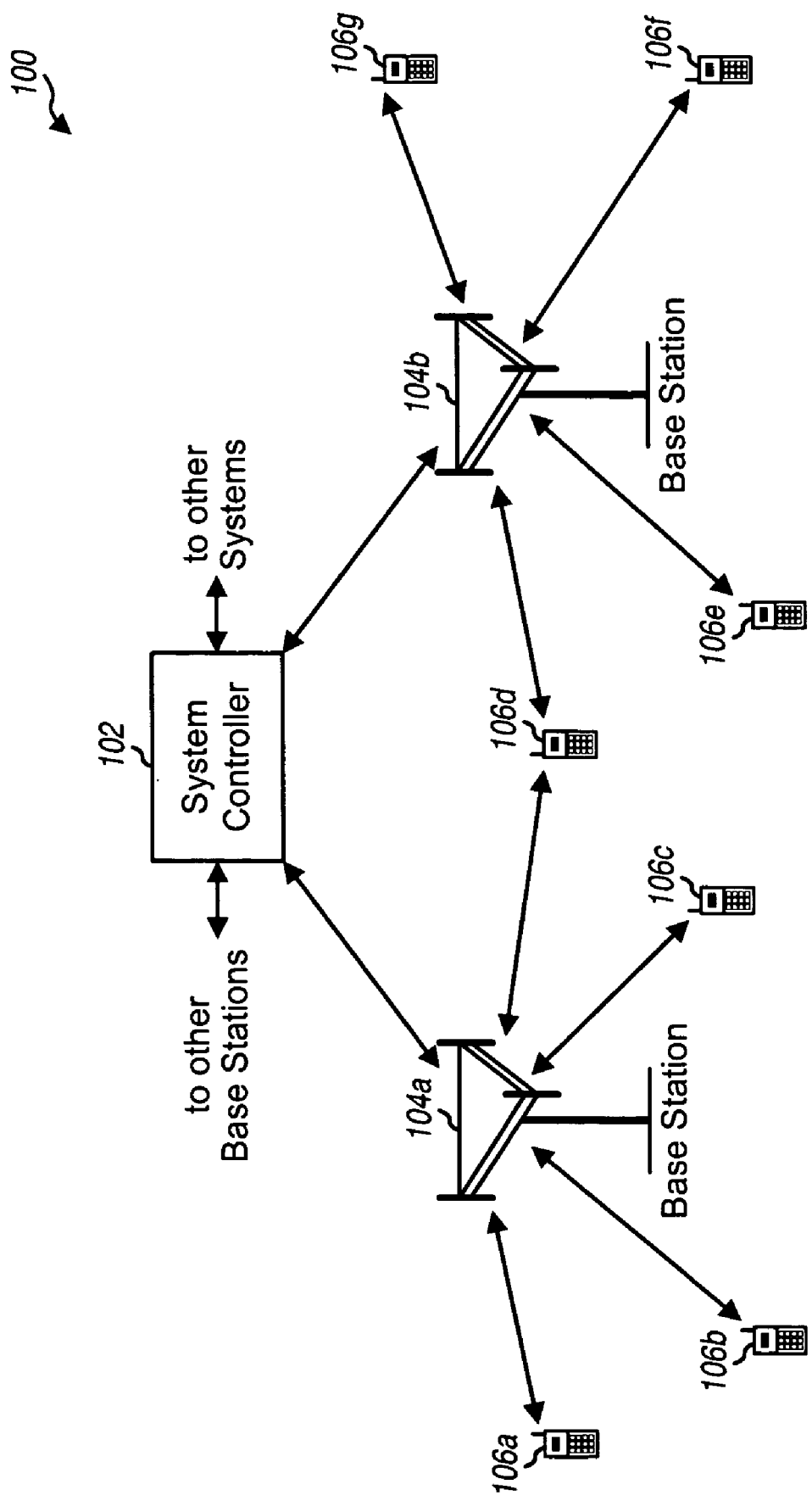
FIG. 1 illustrates a wireless communication system.

FIG. 1 is a diagram of a wireless communication system 100. System 100 includes a number of base stations 104 that communicate with a number of terminals 106. A base station is a fixed station used for communicating with the terminals. A base station may also be referred to as a base transceiver system (BTS), an access point, a Node B, or some other terminology. A terminal may also be referred to as a mobile station, a remote station, an access terminal, a user equipment (UE), or some other terminology. Each terminal may communicate with one or multiple base stations on the forward link and/or reverse link at any given moment. This depends on whether or not the terminal is active, whether or not soft handoff is supported for data transmission, and whether or not the terminal is in soft handoff.

A system controller 102 couples to base stations 104 and may further couple to a public switched telephone network (PSTN) and/or a packet data network (PDN). System controller 102 may also be referred to as a base station controller (BSC), a mobile switching center (MSC), a radio network controller (RNC), or some other terminology. System controller 102 provides coordination and control for the base stations coupled to it. Via the base stations, system controller 102 further controls the routing of calls (1) among the terminals, and (2) between the terminals and other users and entries coupled to the PSTN (e.g., conventional telephones) and PDN.

The techniques described herein for generating quality indicator bits (QIBs) may be implemented in various wireless communication systems. Thus, system 100 may be a Code Division Multiple Access (CDMA) system, a Time Division Multiple Access (TDMA) system, or some other type of system. A CDMA system may be designed to implement one or more standards such as IS-2000, IS-856, W-CDMA, IS-95, and so on. A TDMA system may be designed to implement one or more standards such as Global System for Mobile Communications (GSM). These standards are well known in the art and incorporated herein by reference. For clarity, the techniques for generating quality indicator bits are described specifically for a cdma2000 system that implements IS-2000.

On the forward link, the capacity of each base station is limited by its total transmit power. To maximize forward link capacity while providing the desired level of performance for each active terminal, the transmit power for each user-specific transmission from the base station to a particular terminal may be controlled to be as low as possible. If the received signal quality at the terminal is too poor, then the likelihood of correctly decoding the received transmission decreases and performance may be compromised (e.g., higher FER). On the other hand, if the received signal quality is too high, then the transmit power level is also likely to be too high. In that case, excessive amount of transmit power was used for the transmission, which would then reduce capacity and may further cause extra interference to the transmissions from nearby base stations.

A forward link power control loop is typically used to adjust the transmit power for the user-specific transmission to each terminal such that the received signal quality at the terminal is maintained at the setpoint. A cdma2000 system supports the transmission of three types of power control commands for the forward link power control loop. These command types include power control (PC) bits, erasure indicator bits (EIBs), and quality indicator bits (QIBs). Typically, the terminal is configured to periodically transmit one of these three types or a combination of two types of power control command back to the base station, depending on the selected forward power control mode.

A reverse link power control loop is also typically used to adjust the transmit power of each terminal such that the received signal quality at the base station is maintained at a desired level. The forward and reverse link power control loops are operated independently. Each power control loop requires a feedback stream from the receiver, which is used by the transmitter to adjust its transmit power for the receiver.

In IS-2000, a terminal may be assigned a Forward Fundamental Channel (F-FCH) and a Forward Dedicated Control Channel (F-DCCH) for data transmission on the forward link. If the F-FCH is used for data transmission, then each data frame transmitted on the F-FCH is detected and used to generate the QIB for that data frame. In particular, each transmitted data frame includes a cyclic redundancy check (CRC) value, and this CRC value can be used by the terminal to determine whether the data frame was received correctly (good) or in error (erased). The QIB is then set to "0" if the CRC passes (to indicate sufficient received signal quality) or to "1" if the CRC fails (to indicate insufficient received signal quality). If the F-FCH is not used for data transmission, then the frame detection can be performed on the F-DCCH in similar manner using the CRC included in each data frame transmitted on the F-DCCH.

IS-2000 further requires the terminal to initialize and supervise the operation of forward traffic channels based on the received signal quality for the F-DCCH when it is chosen to carry the forward power control subchannel. As part of the requirements, in a Traffic Channel Initialization state, the terminal can only enable transmission on the reverse link after receiving two consecutive data frames with sufficient received signal quality. Moreover, in a Traffic state, the terminal is required to disable its transmission upon the reception of twelve consecutive data frames with insufficient quality. The terminal is also required to declare that the current call has been dropped and to enter a System Determination state if no data frames are received with sufficient signal quality in any 5-second interval.

Thus, the received signal quality for the F-DCCH needs to be ascertained to (1) generate the QIBs, when the F-FCH is not used for data transmission, and (2) supervise the operation of the F-DCCH, as required by IS-2000. The received signal quality on the F-DCCH is typically determined based on the status of the received data frames (i.e., good or erased). However, the F-DCCH may be operated in a non-continuous manner. When the F-DCCH is in a discontinuous transmission (DTX) state, no data frames are transmitted on this forward channel and only power control commands for the reverse link power control loop are sent on a Forward Power Control Subchannel. When a DTX frame (which is an empty or null frame) is transmitted on the F-DCCH, the QIB cannot be generated in the normal manner based on the CRC value.

The techniques described herein can generate QIBs that can be used for power control purposes even when the forward channel being monitored (e.g., the F-DCCH) is operated in a non-continuous manner. When a data frame is not detected on this channel, another transmission may be used to estimate the received signal quality. For example, the power control commands sent for the reverse link power control loop (i.e., the RL power control commands) may be used to estimate the received signal quality when no data frames are detected. For each frame interval, the QIB may be generated based on either the received data frame (if a good data frame is detected) or the RL power control commands (if a good data frame is not detected).

Figure 2:
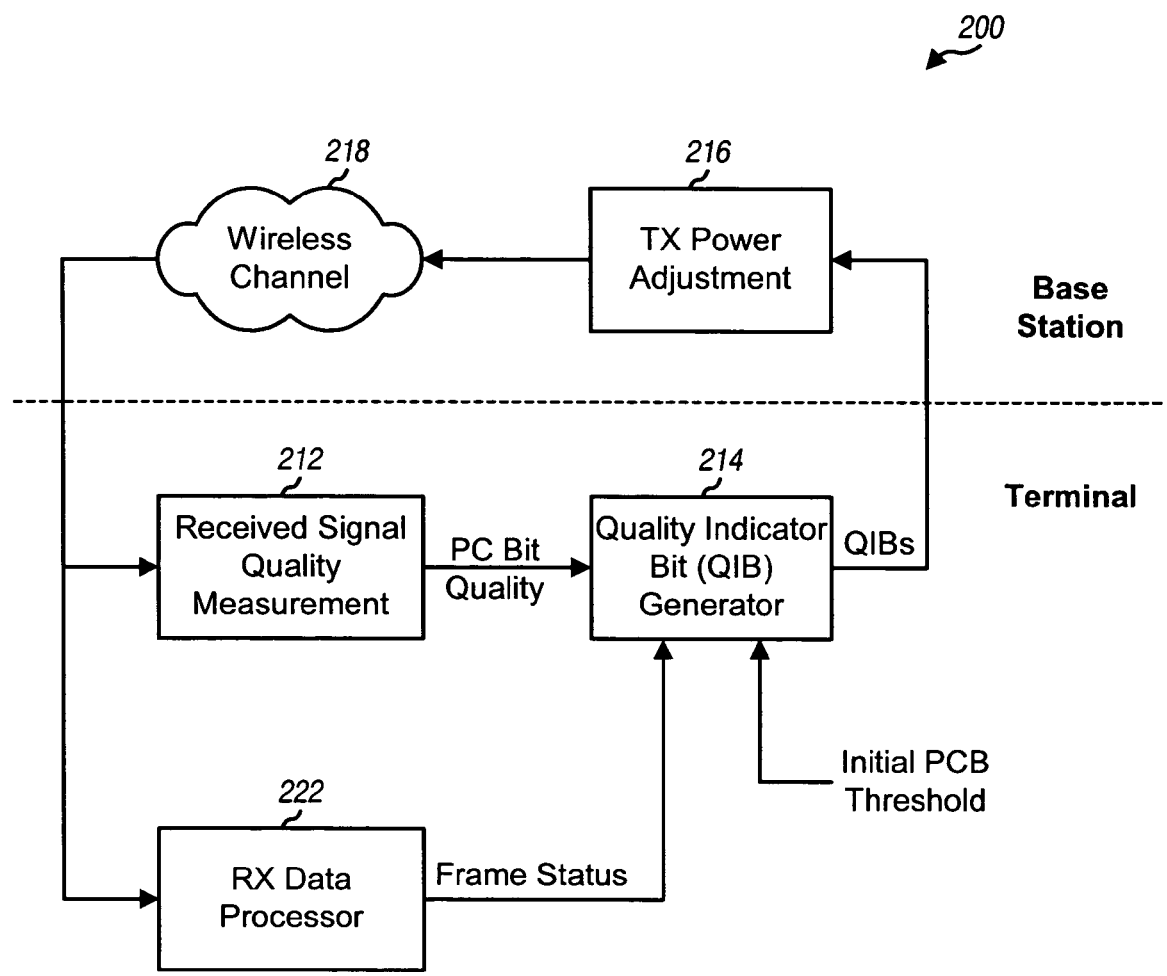
FIG. 2 shows a forward link power control mechanism that can generate QIBs based on a non-continuous transmission on a forward channel.

FIG. 2 is a diagram of a forward link power control mechanism 200 that can generate QIBs based on a non-continuous transmission on a forward channel. These QIBs are indicative of the received signal quality and can thus be used for power control purposes.

The base station generates and transmits a forward link signal to the terminal. This forward link signal includes data (if available), signaling, pilot, and RL power control commands, all of which are carried on their designated forward channels. For a cdma2000 system, data and signaling may be transmitted in (5 or 20 msec) data frames on the F-FCH or the F-DCCH, the pilot is transmitted on a Forward Pilot Channel (F-PICH), and the RL power control commands are transmitted on the Forward Power Control Subchannel. Since the pilot is intended to be received by all terminals in the base station's coverage area, the transmit power for the F-PICH is typically fixed at a particular power level. However, the data and signaling on the F-FCH and F-DCCH are user-specific, and the transmit power for these forward channels can be adjusted for each terminal (block 216).

The forward link signal is transmitted over a wireless channel (cloud 218) to the terminal. Due to path loss in the wireless channel, which typically varies over time and especially for a mobile terminal, the quality of the signal received by the terminal continually fluctuates.

At the terminal, the received signal is processed by an RX data processor 222, which attempts to detect and recover each data frame transmitted on the F-FCH and F-DCCH. RX data processor 222 determines the status of each received data frame (i.e., good or erased) and provides the frame status to a QIB generator 214. A received signal quality measurement unit 212 also processes the received signal, determines the quality of the RL power control bits, and provides the power control (PC) bit quality to QIB generator 214.

QIB generator 214 receives the frame status from RX data processor 222, the PC bit quality from unit 212, and an initial PCB (power control bit) threshold. QIB generator 214 then generates the QIBs based on good data frames received by the terminal, as indicated by the frame status. Otherwise, QIB generator 214 generates the QIBs based on the PC bit quality and the PCB threshold. QIB generator 214 also updates the PCB threshold. The QIBs are sent back to the base station, which may then use these QIBs to adjust the transmit power for the terminal.

FIG. 3A is a diagram illustrating the F-FCH, F-DCCH, and Forward Power Control Subchannel defined by IS-2000. The transmission timeline for the F-FCH and F-DCCH is partitioned into (20 msec) frame intervals. Each frame interval is further partitioned into 16 (1.25 msec) power control groups (PCGs), which are numbered from 0 through 15. Data may be transmitted in 5 msec or 20 msec frames on each of the F-FCH and F-DCCH.

The Forward Power Control Subchannel may be transmitted on either the F-FCH or F-DCCH. The Forward Power Control Subchannel includes one power control bit for the reverse link power control loop (i.e., one FL power control bit) for each power control group. Each FL power control bit occupies $\frac{1}{12}$-th of a power control group and is pseudo-randomly located within the power control group. The remaining portion of each power control group is then used to transmit data for the F-FCH or F-DCCH.

FIG. 3B is a diagram illustrating the Reverse Power Control Subchannel and the Reverse Pilot Channel defined by IS-2000. As shown in FIG. 3B, the Reverse Power Control Subchannel is time multiplexed with the Reverse Pilot Channel. The transmission timeline on this multiplexed channel is also partitioned into (20 msec) frame intervals, with each frame interval being further partitioned into 16 power control groups. For each power control group, pilot data is transmitted in the first three-quarter of the power control group and a power control command is transmitted in the last quarter of the power control group. The 16 power control commands for each frame interval may correspond to 16 power control bits, one EIB, or one QIB.

Figure 4:
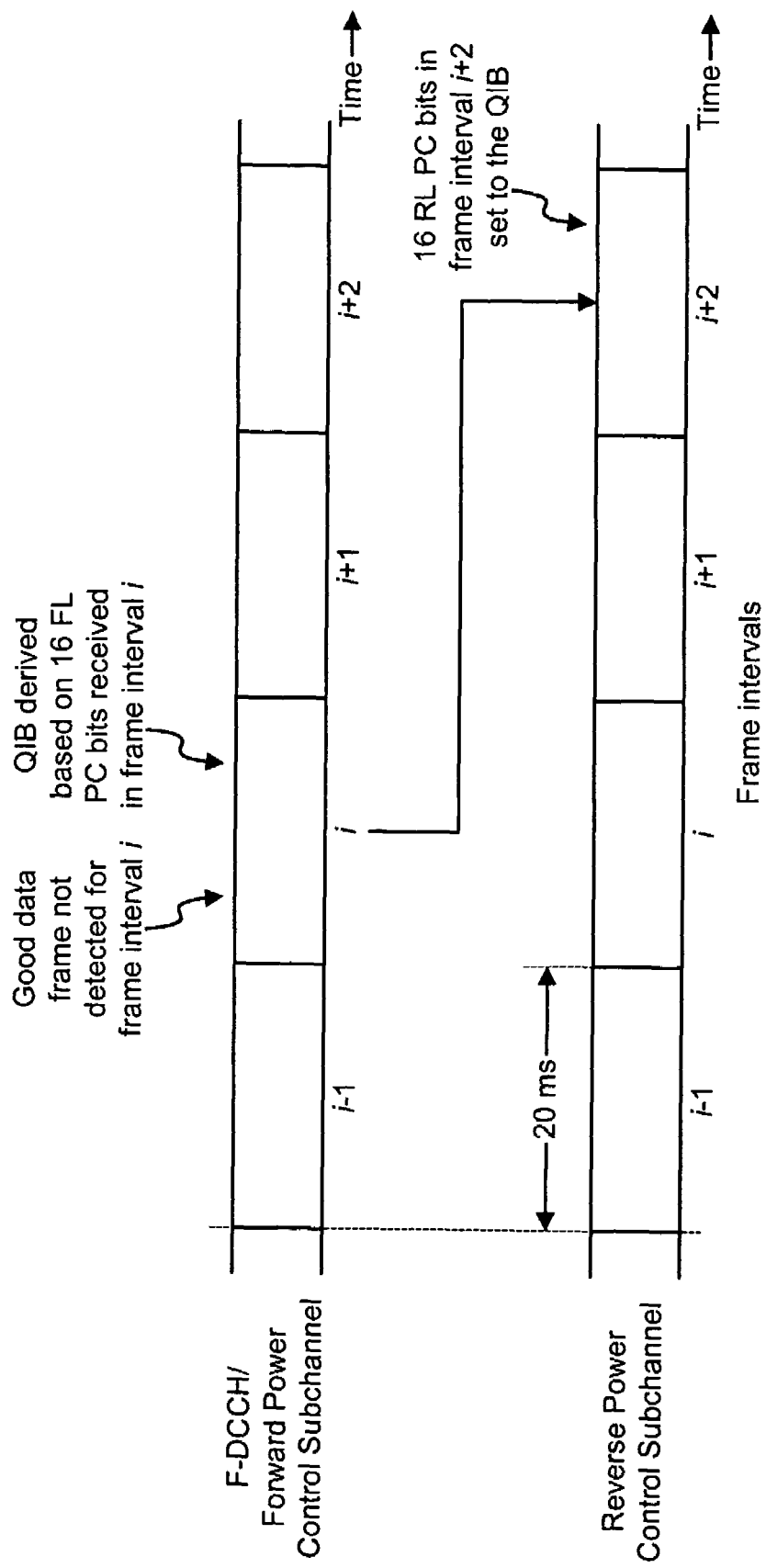
FIG. 4 illustrates the generation and transmission of QIBs for a non-continuous transmission on the F-DCCH.

FIG. 4 is a diagram illustrating the generation and transmission of QIBs on the Reverse Power Control Subchannel for a non-continuous transmission on the F-DCCH. A data frame is received in frame interval i and processed to determine whether or not a good data frame was received. In this example, a good data frame was not detected for frame interval i. The Forward Power Control Subchannel is also processed in frame interval i, and the received signal quality for the 16 FL power control bits received in this frame interval is determined. The QIB for this frame interval is then generated based on the received signal quality for the power control bits. The QIB is then sent back to the base station on the Reverse Power Control Subchannel in frame interval i+2. The QIB generation and transmission are performed for each frame interval.

Figure 5:
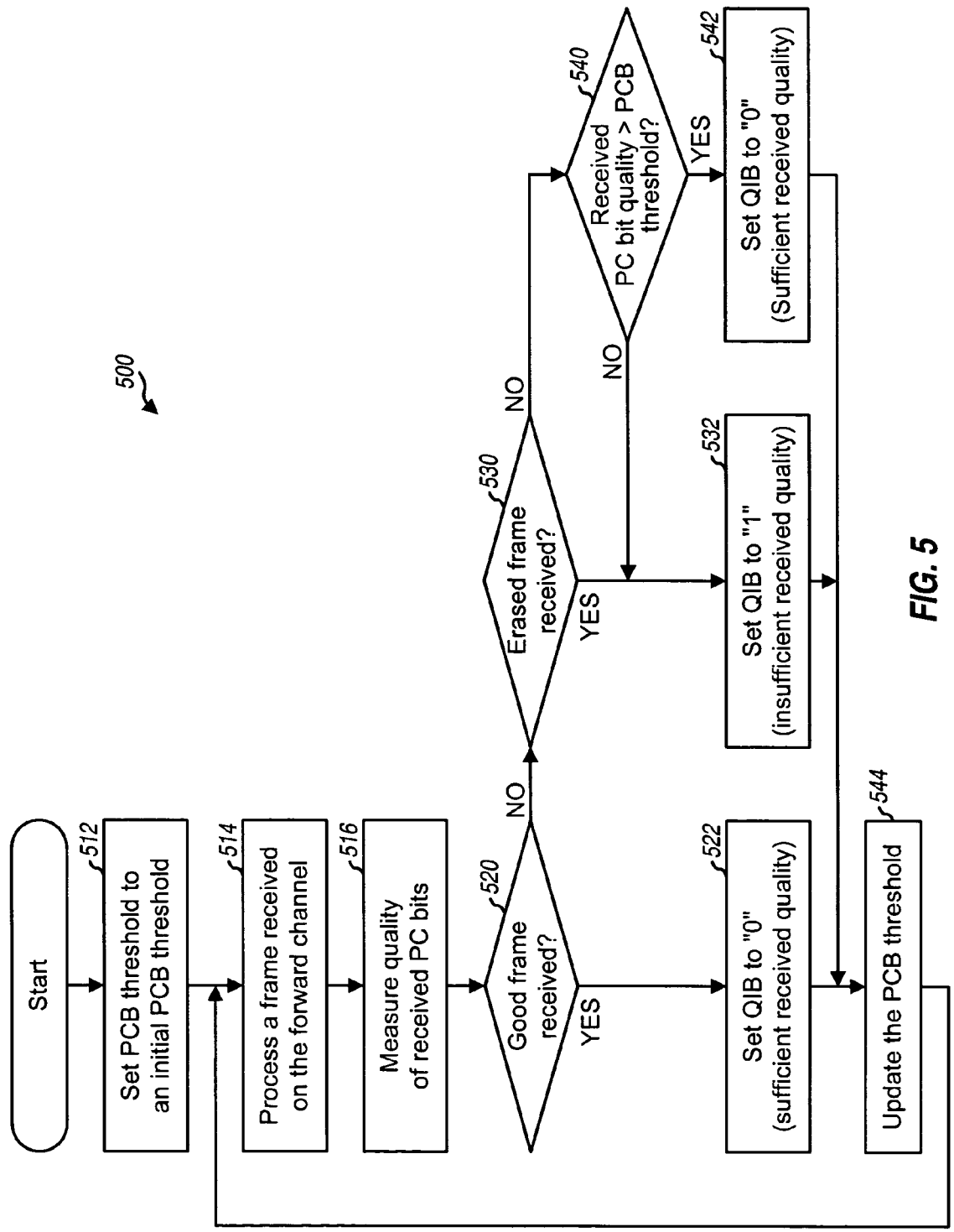
FIG. 5 shows a process for generating QIBs for a non-continuous transmission on the F-DCCH.

FIG. 5 is a flow diagram of an embodiment of a process 500 for generating QIBs for a non-continuous transmission on the F-DCCH.

Initially, a PCB threshold used to compare the received signal quality of the FL power control bits is set to an initial PCB threshold (step 512). Since the PCB threshold is dynamically updated as described below, the initial PCB threshold does not need to be a precise value. However, since transmission on the reverse link is allowed only after receiving two consecutive frames with sufficient quality on the F-DCCH, and since the received signal quality on the F-DCCH is determined by the initial PCB threshold (at least for the first frame), a sufficiently high value is used for the initial PCB threshold so that the reverse link transmission does not start without receiving anything on the F-DCCH. On the other hand, the initial PCB threshold should be low enough so that reverse link transmission can begin.

In an embodiment, the initial PCB threshold is derived based on a minimum setpoint used for the F-DCCH. Moreover, the initial PCB threshold may take into consideration the data rate of the data frames on the F-DCCH, which is determined by the radio configuration (RC) of the terminal. The initial PCB threshold may be also set to some other value. Step 512 is typically performed at the start of a communication session.

A QIB is thereafter generated for each frame interval while the terminal is active. For each frame interval, the F-DCCH is processed to attempt to recover a data frame that may have been transmitted in the frame interval (step 514). The FL power control bits received for the frame interval are also processed, and the received signal quality for these power control bits is measured (i.e., estimated) (step 516). The received signal quality for the power control bits may be determined by (1) measuring the received energy of the power control bits ($E_b$) and (2) dividing the received bit energy ($E_b$) by the total effective noise power spectral density ($N_t$) observed by the forward channel used to send the power control bits (i.e., received signal quality=$E_b/N_t$). Each of these quantities can be determined by the receiver. The determination of the received signal quality is known in the art and not described in further detail herein.

A determination is then made whether or not a good data frame was received for the current frame interval (step 520). This determination may be made based on the CRC value included in each transmitted data frame. A good data frame is declared if the CRC passes, and an erased frame is declared if the CRC fails. The CRC may fail for any one of a number of reasons. For example, the CRC may fail if (1) a data frame was transmitted by the base station but received in error by the terminal, or (2) no data frame was transmitted by the base station.

If a good data frame was received, as determined in step 520, then the QIB for the current frame interval is then set to "0" to indicate that the received signal quality is sufficient (step 522). The PCB threshold is then updated using any one of a number of schemes, some of which are described in further detail below (step 544). The process then returns to step 514 to process the next frame interval.

If a good data frame was not received, as determined in step 520, then a determination is made whether or not an erased frame was received (step 530). If an erased frame was received, then the QIB is set to "1" to indicate that the received signal quality is insufficient (step 532). The process then proceeds to step 544.

If an erased data frame was not received, as determined in step 530, then the received signal quality for the power control bits is compared against the PCB threshold (step 540). If the received power control bit quality is less than or equal to the PCB threshold, then the QIB is set to "1" to indicate that the received signal quality is insufficient (step 532). Otherwise, if the received power control bit quality is greater than the PCB threshold, then the QIB is set to "0" to indicate that the received signal quality is sufficient (step 542). In either case, from steps 532 and 542, the process proceeds to step 544 to update the PCB threshold and then returns to step 514 to process the next frame interval.

The PCB threshold used for comparing the received signal quality for the power control bits can be dynamically updated to provide improved performance for a time-variant wireless channel. In one embodiment, the PCB threshold is updated based on the setpoint used for the F-DCCH. For example, at each frame boundary, the PCB threshold may be set equal to the F-DCCH setpoint minus a back-off factor. This back-off factor may be any value determined empirically or by simulation to provide good performance. As a specific example, the PCB threshold may be set equal to the F-DCCH setpoint minus 5 dB. The F-DCCH setpoint can be advantageously used for the PCB threshold since it (1) is adjusted to achieve the desired level of performance (e.g., 1% FER) and (2) has a built-in averaging mechanism. Various other embodiments to generate QIBs for a non-continuous transmission may also be contemplated, and this is within the scope of the invention.

For example, in another embodiment, the PCB threshold is updated based on the received signal quality for good data frames, which may be quantified by an energy-per-bit-to-noise ratio ($E_b/N_t$). In yet another embodiment, the PCB threshold is updated based on the received signal quality for the power control bits during frame intervals when good data frames were received. For these two embodiments, step 544 may be moved between steps 520 and 522 in FIG. 5. The PCB threshold may also be dynamically updated based on some other quantity or metric such as, for example, received power for the power control bits.

The quantity used to update the PCB threshold may be averaged to smooth out frame-to-frame variations in the measurement of this quantity. Linear averaging may be used to average the measured values for N past frame intervals (which may be the frame intervals for good data frames). Alternatively, exponential averaging may be used to give greater weight to the measured values for more recent good data frames. Again, a back-off factor may be used, and may be selected to provide good performance.

In another embodiment, no attempt is made to differentiate between a DTX frame (i.e., a null or empty frame) and an erased frame (i.e., a data frame transmitted but received in error). The power control bits are used to generate the QIB if a good data frame was not received (i.e., if either a DTX frame or an erased frame was received).

In yet another embodiment, the QIB may be set based on the received signal quality for the bad frame as well as the received signal quality for the power control bits, if a good data frame was not received.

Figure 6:
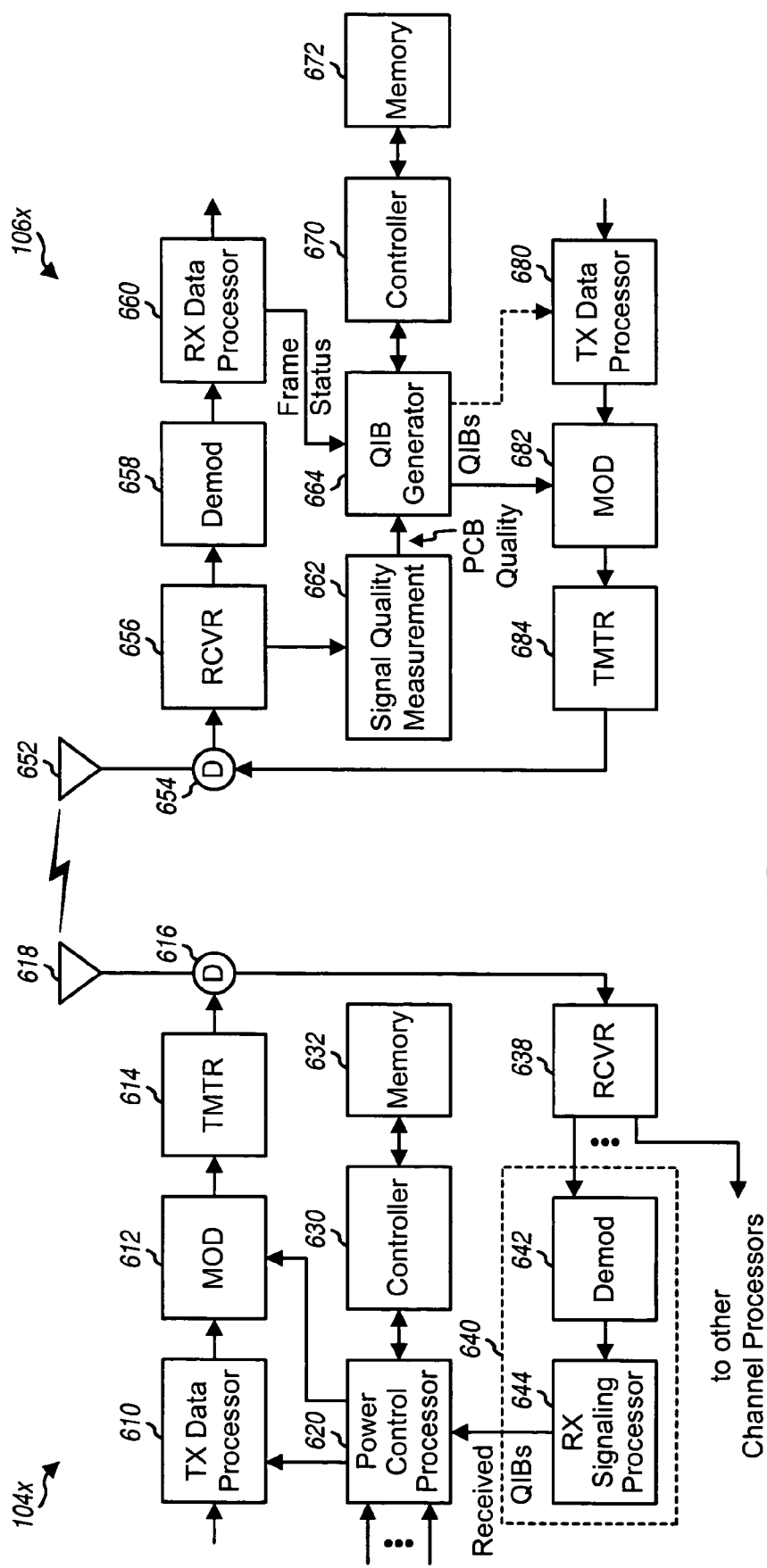
FIG. 6 is a block diagram of a base station and a terminal in the wireless communication system.

FIG. 6 is a block diagram of an embodiment of a base station 104x and a terminal 106x. On the forward link, a transmit (TX) data processor 610 receives data of various types and processes (e.g., formats, encodes, and interleaves) the received data. The processed data is provided to a modulator (MOD) 612 and further processed (e.g., channelized with one or more channelization codes, spectrally spread with a PN sequence, and so on). The modulated data is provided to a transmitter unit (TMTR) 614 and conditioned (e.g., converted to one or more analog signals, amplified, filtered, frequency upconverted, and so on) to generate a forward link signal. The forward link signal is routed through a duplexer (D) 616 and transmitted via an antenna 618 to the terminals.

Although not shown in FIG. 6 for simplicity, base station 104x is capable of processing and transmitting data and signaling on one or more forward channels/subchannels (e.g., the F-FCH, F-DCCH, Forward Power Control Subchannel, and so on) to a particular terminal. The processing (e.g., encoding, modulation, and so on) for each forward channel/subchannel may be different from that of other forward channels/subchannels.

At terminal 106x, the forward link signal is received by an antenna 652, routed through a duplexer 654, and provided to a receiver unit (RCVR) 656. Receiver unit 656 conditions (e.g., filters, amplifies, and frequency downconverts) the received signal and further digitizes the conditioned signal to provide samples. A demodulator (Demod) 658 further processes (e.g., despreads, channelizes, and data demodulates) the samples to provide demodulated data. Demodulator 658 may implement a rake receiver that can concurrently process multiple signal instances in the received signal. A receive (RX) data processor 660 then processes (e.g., deinterleaves and decodes) the demodulated data, checks each received frame, and provides the output data. RX data processor 660 also provides the status of each received frame to a QIB generator 664. The frame status indicates whether or not a good data frame was received for each frame interval.

For the generation of QIBs, the samples from receiver unit 656 are also provided to a signal quality measurement unit 662 that can measure the received signal quality for the power control bits sent on the Forward Power Control Subchannel. The received signal quality measurement can be computed using various techniques, including those described in the U.S. Pat. Nos. 5,056,109 and 5,265,119. The received signal quality for the power control bits (denoted as PCB quality in FIG. 6) is provided to QIB generator 664.

When enabled, QIB generator 664 generates a QIB for each frame interval based on the received data frame or power control bits. More specifically, for each frame interval, the QIB is generated based on either a good data frame (if one was received) or the power control bits (if a good data frame was not received). QIB generator 664 can implement the process shown in FIG. 5 to generate the QIBs. The QIBs may also be generated using any additional information that may be available.

On the reverse link, a TX data processor 680 receives and processes (e.g., formats, encodes) various types of data. A modulator 682 receives the QIBs from QIB generator 664 and the processed data from TX data processor 680 and further processes (e.g., channelizes and spreads) the received data and QIBs. Within modulator 682, the QIBs may be multiplexed with pilot data and transmitted on the Reverse Pilot Channel, as shown in FIG. 3B. The modulated data is then conditioned by a transmitter unit 684 to generate a reverse link signal. The reverse link signal is then routed through duplexer 654 and transmitted via antenna 652 to one or more base stations.

At base station 104x, the reverse link signal is received by antenna 618, routed through duplexer 616, and provided to a receiver unit 638. Receiver unit 638 conditions the received signal, digitizes the conditioned signal, and provides a sample stream to each channel processor 640. Each channel processor 640 includes a demodulator 642 and an RX signaling processor 644 that receive and process the sample stream for one terminal to recover the transmitted data and QIBs. A power control processor 620 receives the QIBs (and/or power control bits and EIBs) and generates one or more signals used to adjust the transmit power for the terminal.

For clarity, various aspects and embodiments of the QIB generation have been specifically described for a cdma2000 system that implements IS-2000. In general, these techniques can be used to generate QIBs for a non-continuous transmission on a "primary" channel using another transmission on a "secondary" channel, when needed. For cdma2000, the primary channel may be the F-DCCH and the secondary channel may be the Forward Power Control Subchannel. In general, the secondary channel may be any channel that carries a transmission that may be used to estimate the received signal quality when the transmission on the primary channel is not available for this purpose. The transmission on the secondary channel need not be continuous.

The techniques described herein may also be used to generate QIBs for a non-continuous transmission on the reverse link.

The QIB generation techniques described herein may be implemented by various means. For example, these techniques may be implemented in hardware, software, or a combination thereof. For a hardware implementation, the QIB generation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the QIB generation techniques may be implemented with modules (e.g., procedures, functions, and so on) that perform the functions described herein. The software codes may be stored in a memory unit (e.g., memory 672 in FIG. 6) and executed by a processor (e.g., controller 670). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A memory unit storing instructions executable by one or more processors for performing a method of generating a quality indicator bit (QIB) value indicative of received signal quality on a primary channel, the method comprising:
   determining a measured signal quality of transmitted power control bits received on a secondary channel when no good data frame is received on the primary channel during a current frame interval;
   comparing the measured signal quality of transmitted power control bits received on the secondary channel to a secondary channel threshold;
   generating the QIB value indicative of received signal quality on the primary channel based on the comparison of measured signal quality of transmitted power control bits received on the secondary channel to the secondary channel threshold.

2. The memory unit of claim 1, wherein the secondary channel is a control channel, and the instruction to generate the QIB value includes evaluating the signal quality of transmitted power control bits received on the control channel.

3. The memory unit of claim 1, wherein the method further comprises dynamically updating the secondary channel threshold.

4. The memory unit of claim 3, wherein the secondary channel threshold is updated based on a target received signal quality of a received signal on the primary channel.

5. The memory unit of claim 3, wherein the secondary channel threshold is updated based on a received signal quality of previously evaluated data frames of a received signal on the primary channel.

6. The memory unit of claim 3, wherein the secondary channel threshold is updated based on a received signal quality for power control bits associated with prior received data frames of a received signal on the primary channels.

7. The memory unit of claim 3, wherein the threshold value is initialized to a value derived based on a minimum required signal quality for data frames received on the primary channel when not in a discontinuous transmission state.

8. The memory readable medium storage unit of claim 1, wherein the QIB value is a single bit value and is indicative of received frames being either good or not good as determined by evaluating a CRC value included with each data frame.

9. The memory readable medium storage unit of claim 1, wherein the primary channel is a forward dedicated control channel (F-DCCH) of an IS-2000 compliant system.

10. A method of generating a quality indicator bit (QIB) value indicative of received signal quality on a primary channel, the method comprising:
- determining a measured signal quality of transmitted power control bits received on a secondary channel when no good data frame is received on the primary channel during a current frame interval;
- comparing the measured signal quality of transmitted power control bits received on the secondary channel to a secondary channel threshold;
- generating the QIB value indicative of received signal quality on the primary channel based on the comparison of measured signal quality of transmitted power control bits received on the secondary channel to the secondary channel threshold; and
- storing the generated QIB value on a computer-readable medium.

11. A system for generating a quality indicator bit (QIB) value indicative of received signal quality on a primary channel, the system comprising:
- a processor configured to determine a measured signal quality of transmitted power control bits received on a secondary channel when no good data frame is received on the primary channel during a current frame interval;
- a thresholder configured to compare the measured signal quality of transmitted power control bits received on the secondary channel to a secondary channel threshold; and
- a generator configured to generate the QIB value indicative of received signal quality on the primary channel based on the comparison of measured signal quality of transmitted power control bits received on the secondary channel to the secondary channel threshold.

12. A system for generating a quality indicator bit (QIB) value indicative of received signal quality on a primary channel, the system comprising:
- means for determining a measured signal quality of transmitted power control bits received on a secondary channel when no good data frame is received on the primary channel during a current frame interval;
- means for comparing the measured signal quality of transmitted power control bits received on the secondary channel to a secondary channel threshold; and
- means for generating the QIB value indicative of received signal quality on the primary channel based on the comparison of measured signal quality of transmitted power control bits received on the secondary channel to the secondary channel threshold.

* * * * *